Figure 4:
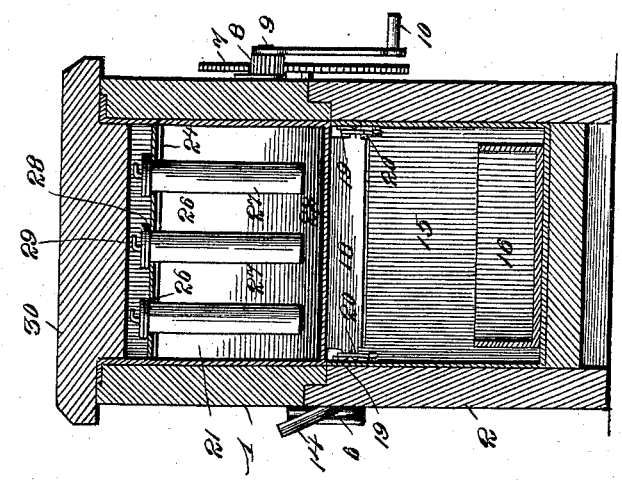

(No Model.) 2 Sheets—Sheet 1.
J. W. HART.
ICE CREAM FREEZER.
No. 585,754. Patented July 6, 1897.
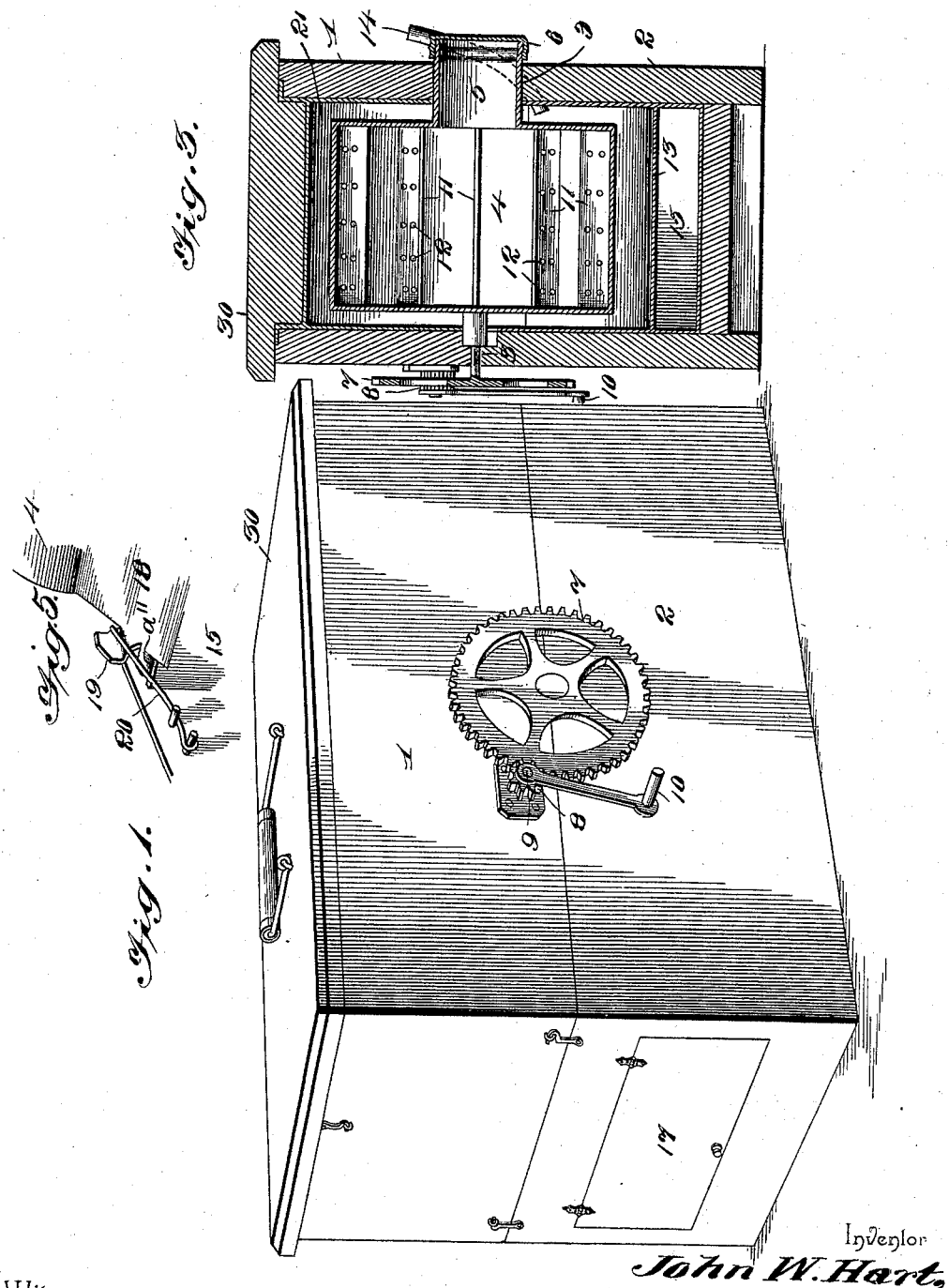
Witnesses
W. J. Koerth.
R. M. Smith.
Inventor
John W. Hart,
By his Attorneys,
C. A. Snow & Co.

(No Model.) 2 Sheets—Sheet 2.

J. W. HART.
ICE CREAM FREEZER.

No. 585,754. Patented July 6, 1897.

Witnesses

Inventor
John W. Hart,
By his Attorneys,
C. A. Snow & Co.

UNITED STATES PATENT OFFICE.

JOHN WILEY HART, OF GUTHRIE, OKLAHOMA TERRITORY, ASSIGNOR OF ONE-HALF TO JOHN McBRINE, OF SAME PLACE.

ICE-CREAM FREEZER.

SPECIFICATION forming part of Letters Patent No. 585,754, dated July 6, 1897.

Application filed April 28, 1896. Serial No. 589,428. (No model.)

*To all whom it may concern:*

Be it known that I, JOHN WILEY HART, a citizen of the United States, residing at Guthrie, in the county of Logan and Territory of Oklahoma, have invented a new and useful Ice-Cream Freezer, of which the following is a specification.

This invention relates to ice-cream freezers, and has for its object to improve the general construction of such devices, with a view to reducing the time required in bringing the cream to the freezing-point, thus increasing the capacity of the freezer.

To this end the invention consists in certain novel features and details of construction and arrangement of parts, as hereinafter fully described, illustrated in the drawings, and embodied in the claim.

Figure 3:
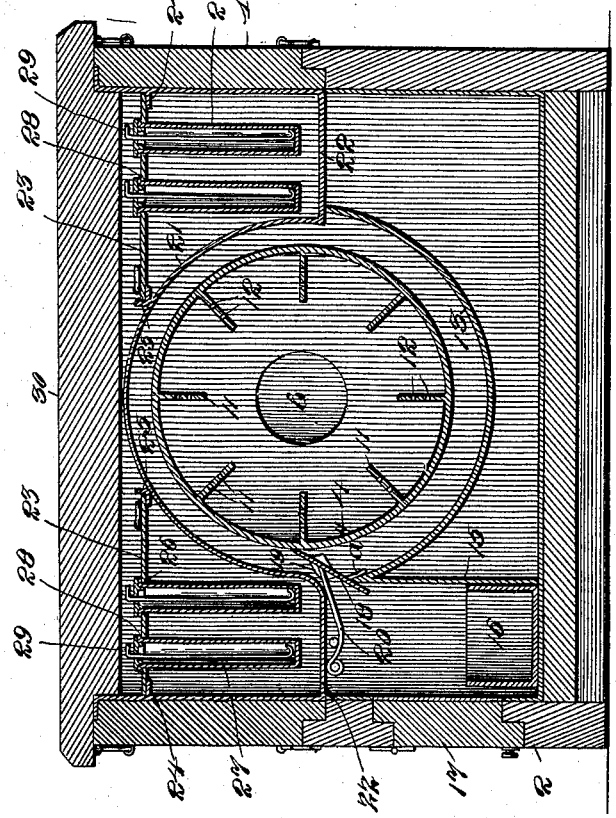

In the accompanying drawings, Figure 1 is a perspective view of an ice-cream freezer constructed in accordance with the present invention. Fig. 2 is a vertical longitudinal section through the same. Fig. 3 is a transverse vertical section thereof, taken centrally. Fig. 4 is a similar view taken near one end of the freezer in line with the individual cylinders. Fig. 5 is a detail perspective view showing the manner of mounting and actuating the scraper.

Similar numerals and letters of reference designate corresponding parts in the several figures of the drawings.

Referring to the accompanying drawings, the body of the freezer is formed in two sections, an upper section 1 and a lower section 2, the said sections having a rabbeted engagement with each other, as shown, for excluding the outer atmosphere. Both of these sections are suitably lined with zinc or other suitable material, and the meeting edges of the sections are provided about centrally with transversely-alined bearings 3 for the reception of the trunnions of a revoluble cylinder 4. The cylinder 4 is hollow and is provided at one side with a hollow trunnion 5, projecting through the side wall of the body of the freezer and having a screw-cap 6 for closing the same, this arrangement adapting the hollow cylinder to be filled with freezing mixture. The trunnion at the opposite side of the cylinder is also extended through the body of the freezer and has secured thereto a toothed gear-wheel 7, which meshes with and is driven by a pinion 8, mounted on a short stud-shaft 9, connected to the upper section 1 and provided with a crank-handle 10, provision being thus made for imparting rotary motion to the cylinder 4.

The cylinder 4 is provided upon its inside with a series of radial blades or transverse webs 11, which extend from the rim or inner surface of the periphery of the cylinder inward any desired distance. Buckets are thus formed, each of which is adapted to contain a quantity of the ice and salt or other freezing mixture and to carry the same upward, so that it will revolve with the cylinder necessarily. These cross-webs are provided with openings 12, through which the water may drain, thus enabling the water to remain in the bottom portion of the cylinder, while the ice only is carried around therein. This prolongs the life of the ice or other freezing mixture and renders the freezer more economical in use.

Within the lower section 2 is located a segmental partition 13, which extends under the periphery of the cylinder 4 and forms a concavity or compartment in which the cream to be frozen is placed, such cream being introduced therein through a tube 14, passing through the wall of the freezer. At one end of the partition 13 is a vertical partition 15, between which and the end of the body of the freezer is placed a receiving box or vessel 16, which is removable through an opening in the end of the body, such opening being closed, preferably, by means of a hinged door 17. The compartment beneath the segmental partition 13 is intended to be filled with ice and salt, so that the cream or other material to be frozen is located between two bodies of ice, one in the lower section 2 and the other in the cylinder 4.

Ice is introduced into the compartment under the partition 13 by removing the upper section 1.

18 designates a spring-actuated scraper, which is preferably a sheet-metal plate provided with slits in its lower edge and having the portions separated by the slits bent, forming wings *a* to engage the upper edge of the vertical partition 15, whereby it is adapted to fulcrum on said edge. The scraper is also provided with lateral ears 19, bent to form hooks in which are received the free ends of a pair of spring-arms 20, arranged at each side of the freezer-body over the box or receptacle 16. These spring-arms exert their tension to hold the free edge of the scraper 18 in close contact with the periphery of the cylinder 4, and as the cream freezes upon the surface of the cylinder it is scraped therefrom by said scraper and deflected by the latter into the receptacle 16.

The upper section 1 of the freezer-body is provided with a segmental partition 21, the same being extended horizontally at its ends to form the bottom 22 of the upper section. The space around and about said partition 21 is adapted to be filled with ice and salt, after which horizontal covers 23 are placed over the ice at each side of the center, said covers being supported upon rests or shoulders 24 at the ends of the freezer and other rests 25 on the partition 21. Each of said covers is formed with a series of openings 26, through which may be inserted any desired number of cream-containing vessels 27. These vessels are preferably of cylindrical form with their lower ends closed and their upper ends provided with circumferential flanges 28, which rest upon the upper surface of the cover and support the cylinders in place.

An extracting device 29 is placed in each cylinder, such device consisting of a piece of wire or metal of slightly-greater length than the cylinder and having its lower end hooked, whereby it is adapted to engage the frozen contents of the cylinder for facilitating a removal thereof. The cylinders 27, either before or after they are filled, are pushed downward through the openings 26 and firmly embedded in the freezing mixture, and after they are all in place the lid 30 of the freezer is applied, said lid having a rabbeted engagement with the upper section 1. The lid is held in place by means of suitable hooks connecting with the upper section 1, and the two sections may be held together in a similar manner.

By the construction above described it will be seen that the presence of so much ice or freezing mixture around or about the central cylinder will prevent the ice or freezing mixture in the cylinder from melting as rapidly as it otherwise would. The cream on the surface of the cylinder will also be frozen much harder and in a much shorter time. The freezer is also adapted at one and the same time to manufacture ice-cream in two different forms—viz., in the form of cylinders, which may be removed as desired, and also in bulk, as in the ordinary manner. The frozen cream in the cylinders may be readily removed with the aid of the extractors, rolled in paper, and sold in the form of what is known as "hoky-poky" or "stick" cream.

It will be understood that the device is susceptible of various changes in the form, proportion, and minor details of construction, which may accordingly be resorted to without departing from the spirit or sacrificing any of the advantages of this invention.

Having thus described the invention, what is claimed as new is—

In an ice-cream freezer, the combination of a body, a vertical partition subdividing the body into two compartments, a cylinder rotatably mounted to one side of the partition, a scraper comprising a sheet-metal plate having transverse and longitudinal slits at its ends, and having the parts formed by the said slits deflected to provide ears and wings substantially as shown, the wings engaging over the top edge of the said vertical partition, and springs exerting a pressure against the said ears to hold the edge of the scraper against the cylinder, substantially as specified.

In testimony that I claim the foregoing as my own I have hereto affixed my signature in the presence of two witnesses.

JOHN WILEY HART.

Witnesses:
DAVID HETSCH,
DANIEL MCCRAY.